US009274737B2

(12) United States Patent
Nebayashi

(10) Patent No.: US 9,274,737 B2
(45) Date of Patent: Mar. 1, 2016

(54) INFORMATION SHARING SYSTEM, INFORMATION SHARING MANAGEMENT DEVICE, AND INFORMATION SHARING METHOD

(75) Inventor: Hideaki Nebayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/343,552

(22) PCT Filed: Sep. 14, 2012

(86) PCT No.: PCT/JP2012/005873
§ 371 (c)(1),
(2), (4) Date: Mar. 7, 2014

(87) PCT Pub. No.: WO2013/038693
PCT Pub. Date: Mar. 21, 2013

(65) Prior Publication Data
US 2014/0211260 A1 Jul. 31, 2014

(30) Foreign Application Priority Data

Sep. 16, 2011 (JP) .................................. 2011-202500

(51) Int. Cl.
*G06F 3/12* (2006.01)
*G06F 13/00* (2006.01)
*H04M 11/00* (2006.01)
*H04L 29/06* (2006.01)
*H04L 12/24* (2006.01)

(52) U.S. Cl.
CPC .............. *G06F 3/1293* (2013.01); *G06F 13/00* (2013.01); *H04L 41/00* (2013.01); *H04L 41/082* (2013.01);
(Continued)

(58) Field of Classification Search
CPC . H04L 41/0893; H04L 12/14; H04L 41/5003; H04L 41/5025; H04L 47/2408
USPC .................................................. 358/1.1–3.29
See application file for complete search history.

(56) References Cited

U.S. PATENT DOCUMENTS 8,380,835 B2 * 2/2013 Sagara .................. G06F 3/1203
358/1.15
2004/0215974 A1 10/2004 Conley et al.
(Continued)

FOREIGN PATENT DOCUMENTS

EP 1471708 A2 10/2004
JP 2004-336741 A 11/2004
(Continued)

OTHER PUBLICATIONS

International Search Report issued for PCT/JP2012/005783, Nov. 20, 2012, 2 pages.

*Primary Examiner* — Marcellus Augustin
(74) *Attorney, Agent, or Firm* — Wilmer Cutler Pickering Hale and Dorr LLP

(57) ABSTRACT

Provided is an information sharing system which allows setting information relating to a second communication device to be shared with a first communication device. The information sharing system includes an information collection device that retains the setting information and is communicatively connected to the first communication device, and a management device that makes a request for transmission of the setting information with respect to the information collection device. The management device includes a communication management unit that determines whether or not communication is established between the first and second communication devices when receiving the request for transmission of the setting information, and an information request unit that makes a request for transmission of the setting information with respect to the information collection device in a case where it is determined by the communication management unit that the communication is established between the first and second communication devices. The information collection device includes an information management unit that transmits the setting information to the first communication device in response to the request made by the information request unit.

7 Claims, 18 Drawing Sheets

(52) U.S. Cl.
CPC ............ *H04L 63/1466* (2013.01); *H04L 65/10* (2013.01); *H04L 65/1069* (2013.01); *H04M 11/00* (2013.01)

(56) References Cited

U.S. PATENT DOCUMENTS

| | | | |
|---|---|---|---|
| 2007/0019806 A1 | 1/2007 | Conley et al. | |
| 2008/0144095 A1* | 6/2008 | Suzuki | 358/1.15 |
| 2011/0320952 A1* | 12/2011 | Kataoka | H04L 41/0253 715/735 |
| 2012/0057602 A1* | 3/2012 | Tanimoto | H04L 41/0893 370/401 |

FOREIGN PATENT DOCUMENTS

| | | |
|---|---|---|
| JP | 2007-286821 A | 11/2007 |
| JP | 2009-187322 A | 8/2009 |
| JP | 2010-273101 A | 12/2010 |

\* cited by examiner

FIG. 4

| ADDRESS OF COMMUNICATION TERMINAL | ADDRESS OF INFORMATION TERMINAL/ADDRESS OF INFORMATION COLLECTION DEVICE | KIND |
|---|---|---|
| Support01@△△△.co.jp | Display01@△△△.co.jp | PC |
| Support02@△△△.co.jp | Display01@△△△.co.jp | PC |
| ... | | |
| User01@□□□.ne.jp | HGW01@□□□.ne.jp | HOME GATEWAY |
| User02@□□□.ne.jp | HGW01@□□□.ne.jp | HOME GATEWAY |
| User03@□□□.ne.jp | HGW01@□□□.ne.jp | HOME GATEWAY |
| ... | | |

FIG. 10

| ADDRESS OF COMMUNICATION DEVICE | ADDRESS OF INFORMATION COLLECTION DEVICE |
|---|---|
| User01@□□□.ne.jp | HGW01@□□□.ne.jp |
| User02@□□□.ne.jp | HGW01@□□□.ne.jp |
| User03@□□□.ne.jp | HGW01@□□□.ne.jp |
| ... | |

# INFORMATION SHARING SYSTEM, INFORMATION SHARING MANAGEMENT DEVICE, AND INFORMATION SHARING METHOD

CROSS-REFERENCE TO RELATED APPLICATIONS

This application is a national stage application of International Application No. PCT/JP2012/005873 entitled "Information Sharing System, Information Sharing Management Device, and Information Sharing Method," filed on Sep. 14, 2012, which claims the benefit of the priority of Japanese patent application 2011-202500, filed on Sep. 16, 2011, the disclosures of each of which are hereby incorporated by reference in their entirety.

TECHNICAL FIELD

The present invention relates to a technology of an information sharing system in which information is shared between devices that are connected to a network, and the like.

BACKGROUND ART

As a method of sharing information through a network, means for sharing the information by transmitting and receiving the information between terminals may be exemplified. For example, Patent Document 1 discloses an information sharing system that secures stability by sharing only information that is provided from a specific device.

RELATED DOCUMENT

Patent Document

[Patent Document 1] Japanese Unexamined Patent Publication No. 2007-286821

DISCLOSURE OF THE INVENTION

However, in Patent Document 1, prior to request for printing, it is necessary to transmit and receive an IP address of a print server and a printer that are information providing destinations and an IP address of a client PC that is an information providing source. In addition, a data session is established between the printer server and the client PC, and thus when the IP address is intercepted, it may be affected by impersonation and the like.

An object of the invention is to provide an information sharing system, an information sharing management device, and an information sharing method which are capable of stably sharing information.

According to an aspect of the invention, there is provided an information sharing system in which setting information relating to a second communication device is shared with a first communication device. The information sharing system includes an information collection device that retains the setting information and is communicatively connected to the first communication device, and a management device that makes a request for transmission of the setting information with respect to the information collection device. The management device includes a communication management unit that determines whether or not communication is established between the first and second communication devices when receiving the request for transmission of the setting information, and an information request unit that makes a request for transmission of the setting information with respect to the information collection device in a case where it is determined by the communication management unit that the communication is established between the first and second communication devices. The information collection device includes an information management unit that transmits the setting information to the first communication device in response to the request made by the information request unit.

According to another aspect of the invention, there is provided an information sharing management device which allows setting information relating to a second communication device to be shared with a first communication device. The information sharing management device includes a communication management unit that determines whether or not communication is established between the first and second communication devices when receiving the request for transmission of the setting information, and an information request unit that makes a request for transmission of the setting information with respect to an information collection device that retains the setting information and is communicatively connected to the first communication device in a case where it is determined by the communication management unit that communication between the first and second communication devices is established.

According to still another aspect of the invention, there is provided an information sharing method which allows setting information relating to a second communication device to be shared with a first communication device. The method includes a step of allowing a management device to receive a request for transmission of the setting information, a step of allowing the management device to determine whether or not communication is established between the first and second communication devices, a step of allowing the management device to make a request for transmission of the setting information with respect to an information collection device that retains the setting information and is communicatively connected to the first communication device in a case where it is determined in the determination step that communication is established between the first and second communication devices, and a step of allowing the information collection device to transmit the setting information to the first communication device in response to the request in the request step.

Advantageous Effect of the Invention

According to the invention, it is possible to provide an information sharing system, an information sharing management device, and an information sharing method which are capable of stably sharing information.

BRIEF DESCRIPTION OF THE DRAWINGS

The above and other objects, advantages and features of the present invention will be more apparent from the following description of certain preferred embodiments taken in conjunction with the accompanying drawings.

FIG. 4 is a diagram illustrating an example of a management table that is retained by a management server.

FIG. 10 is a diagram illustrating an example of a management table according to a third embodiment.

DESCRIPTION OF EMBODIMENTS

Figure 1:
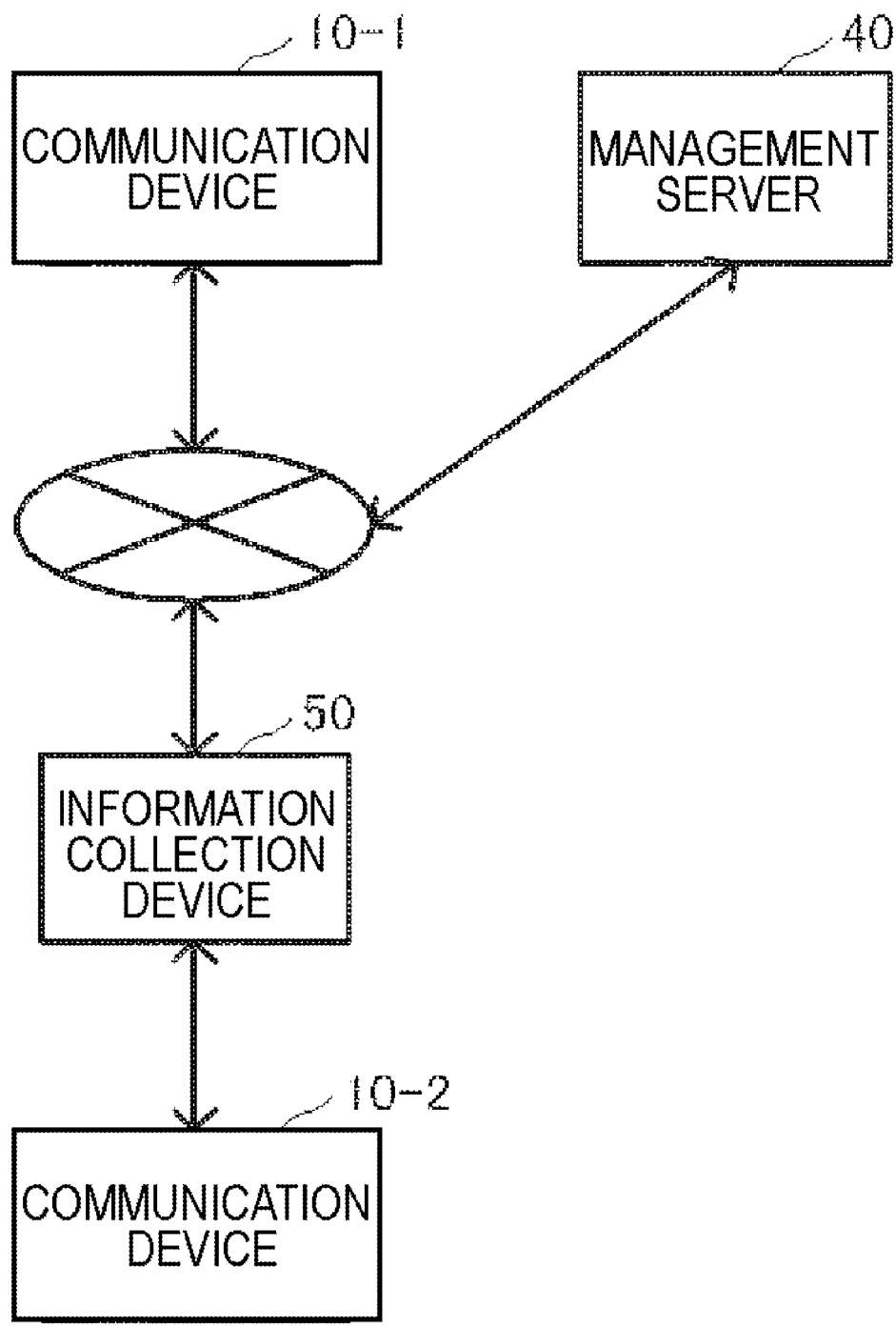
FIG. 1 is a diagram illustrating a configuration of an information sharing system according to a first embodiment of the invention.

Hereinafter, embodiments to carry out the invention will be described with reference to the attached drawings. However, the embodiments are illustrative only, and various configurations other than the following configurations may be employed. In addition, in all of the drawings, like reference numerals will be given to like parts having substantially the same functions, and description thereof will not be repeated.

First Embodiment

FIG. 1 shows a diagram illustrating a configuration of an information sharing system according to a first embodiment. In FIG. 1, the information sharing system includes communication devices 10-1 and 10-2 that are connected through a network, a management server 40, and an information collection device 50.

When receiving a request for transmission of setting information relating to the communication device 10-2, the management server 40 determines whether or not communication is established between the communication device 10-1 and the communication device 10-2. In a case where communication is established between the communication device 10-1 and the communication device 10-2, the management server 40 makes a request for transmission of the setting information relating to the communication device 10-2 with respect to the information collection device 50 that is communicatively connected to the management server 40 through a network.

The information collection device 50 retains the setting information and is communicatively connected to the communication device 10-1 through the network. The information collection device 50 transmits the setting information to the communication device 10-1 in response to the request made by the management server 40. According to this, the communication device 10-1 can share the setting information relating to the communication device 10-2.

When being configured as described above, it is not necessary for the communication device 10-1 and the communication device 10-2 to directly transmit and receive the setting information that is shared, and the information sharing system according to the embodiment may stably share information.

Second Embodiment

An information sharing system according to a second embodiment has various configurations for sharing information in a more secure manner in addition to the first embodiment.

Figure 2:
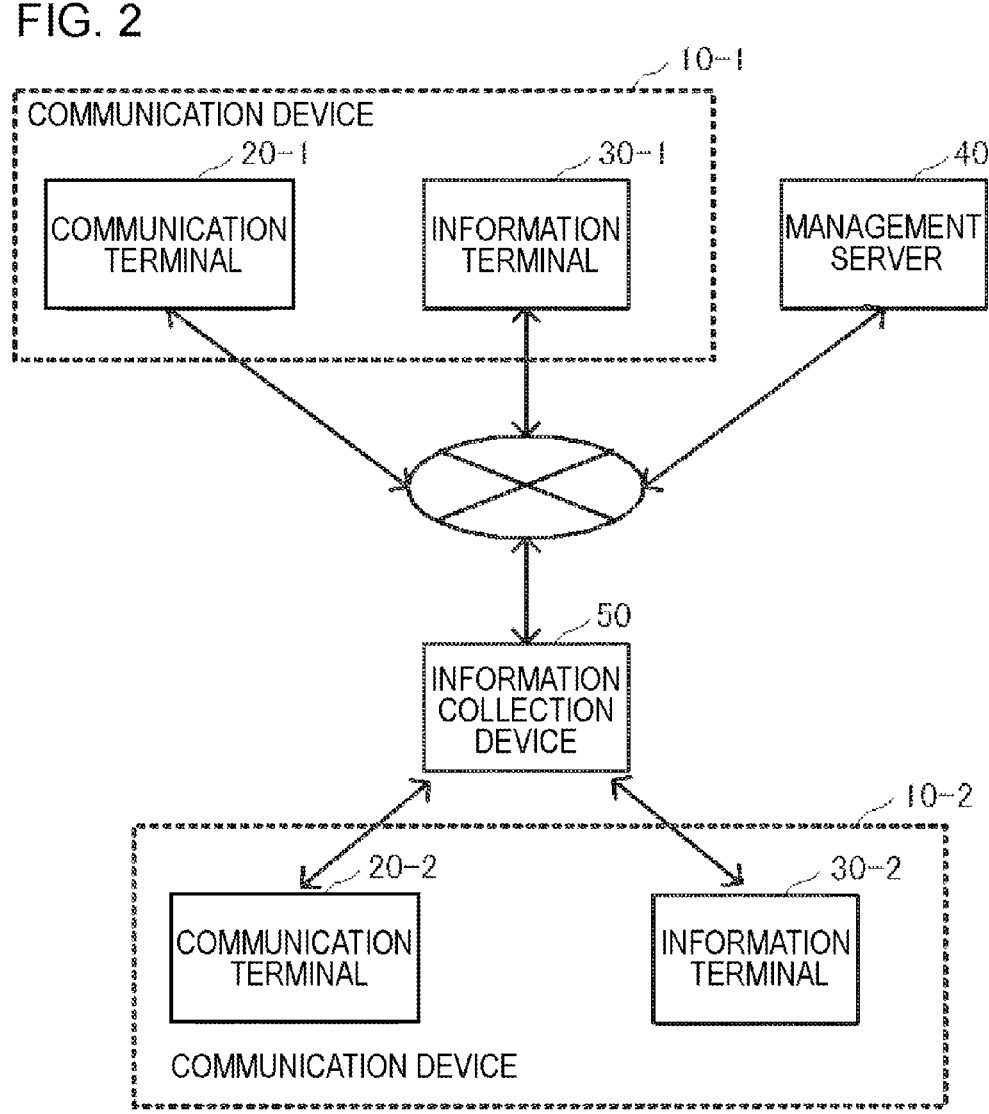
FIG. 2 is a diagram illustrating a configuration of an information sharing system according to a second embodiment of the invention.

FIG. 2 shows a diagram illustrating a configuration of the information sharing system according to the embodiment. In the information sharing system shown in FIG. 2, the communication device 10-1 includes a communication terminal 20-1 and an information terminal 30-1, and the communication terminal 20-1 and the information terminal 30-1 have addresses on networks which are different from each other. In addition, similarly, the communication device 10-2 includes a communication terminal 20-2 and an information terminal 30-2, and both terminals have addresses on networks which are different from each other.

The communication terminal 20-1 and the communication terminal 20-2 are terminals that are operated by a user or an operator, and establish communication through a network. For example, the communication terminals 20-1 and 20-2 are terminals such as an SIP telephone which makes a call using an SIP protocol, a TV telephone, a cellular phone, and a PHS which are capable of carrying out a text or voice chat. In the embodiment, a case in which the communication terminal 20-1 is operated by the operator and the communication terminal 20-2 is operated by the user will be described as an example.

The information terminal 30-1 and the information terminal 30-2 are terminals which are operated by the user or the operator, and which are capable of transmitting and receiving data through a network. The information terminal 30-1 and the information terminal 30-2 can share setting information relating to one information terminal with the other information terminal. For example, the setting information is information relating to a capacity of a hard disk of the information terminal 30-2, information relating to a printer that is set by the information terminal 30-2, or information relating to power ON/OFF of the information terminal 30-2.

In addition, for example, the information terminals 30-1 and 30-2 are general-purpose PCs or note-type PCs. In the embodiment, a case in which the information terminal 30-1 is operated by the operator and the information terminal 30-2 is operated by the user, and the setting information relating to the information terminal 30-2 is displayed on the information terminal 30-1 will be described as an example.

The management server 40 establishes communication between the communication terminal 20-1 and the communication terminal 20-2. In a case where a communication terminal is the SIP telephone, for example, the management server 40 is a call control server. In a case where the communication terminal is the TV telephone, the cellular phone, and the PHS, the management server 40 is exchange equipment or the like. The management server 40 stores information that is necessary to specify the information collection device 50 that retains setting information. In the embodiment, a case in which the management server 40 retains a management table to be described later will be described as an example. The management server 40 instructs the information collection device 50 to transmit setting information of the information terminal 30-2.

For example, the information collection device 50 is a server or a home gateway, and retains the setting information of the information terminal 30-2 that is operated by the user. In a case where the information collection device 50 is the home gateway, the communication terminal 10-2 and the information terminal 20-2 are communicatively connected to the information collection device 50 through a home network (not shown). The information collection device 50 transmits the setting information of the information terminal 30-2 to the information terminal 30-1 in response to a request made by the management server 40.

Figure 3:
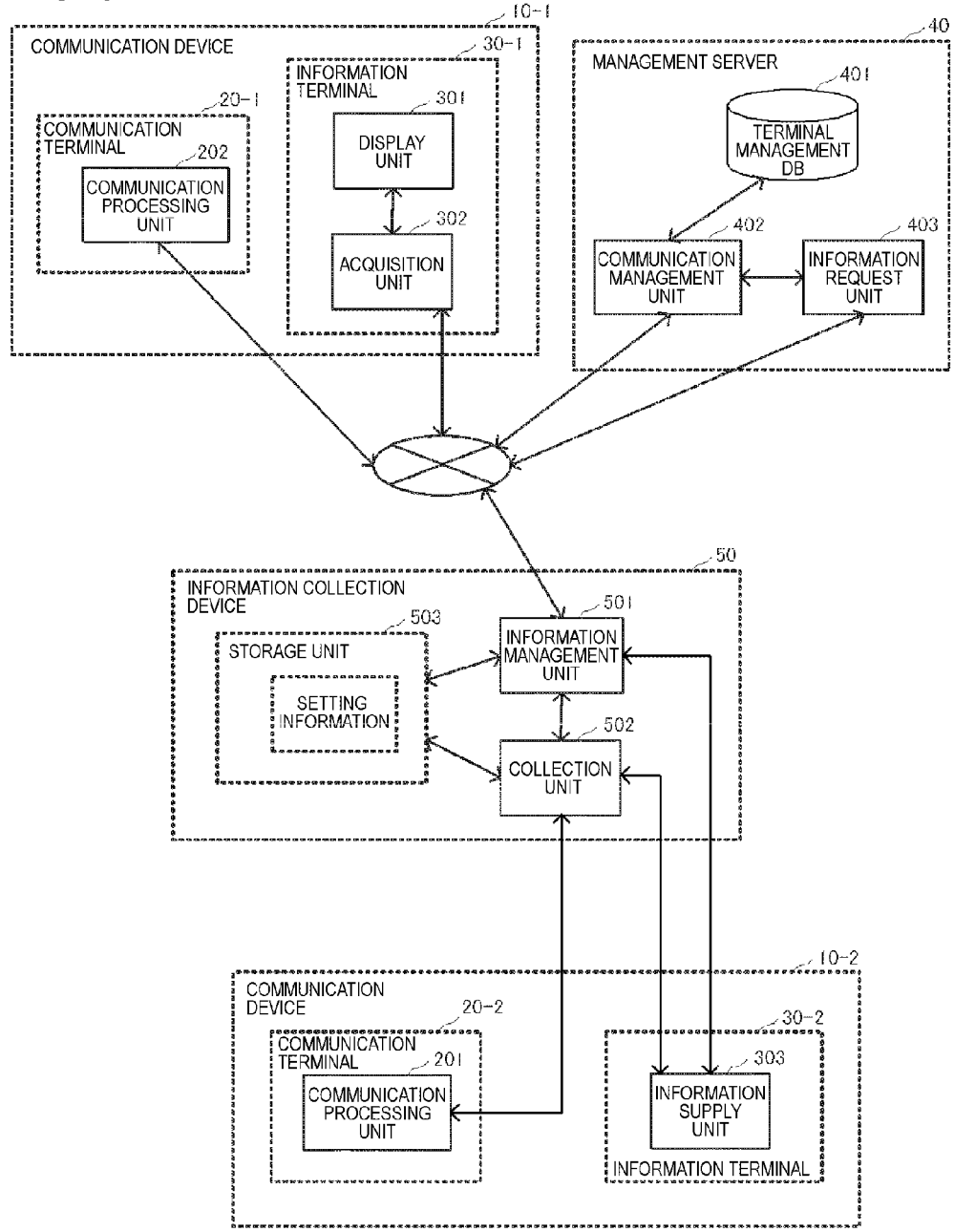
FIG. 3 is a diagram illustrating details of the configuration of the information sharing system shown in FIG. 2.

FIG. 3 shows a diagram illustrating details of the block diagram shown in FIG. 2. The communication terminal 20-1 includes a communication processing unit 202, and the communication terminal 20-2 includes a communication processing unit 201. The communication processing unit 201 and the communication processing unit 202 carry out a process that is necessary for initiation and termination of communication with a communication counterpart.

The information terminal 30-1 includes a display unit 301 and an acquisition unit 302. The acquisition unit 302 makes a request for the setting information to the management server 40. In addition, the acquisition unit 302 displays setting information received from the information collection device 50 on the display unit 301.

The information terminal 30-2 includes an information supply unit 303. The information supply unit 303 transmits setting information relating to the information terminal 30-2 to the information collection device 50.

The management server 40 includes a terminal management database (terminal management DB) 401, a communication management unit 402, and an information request unit 403. The terminal management DB 401 stores a management table. The communication management unit 402 carries out a process necessary for initiation and termination of communication between the communication terminal 20-1 and the communication terminal 20-2. In addition, when communication between the communication terminal 20-1 and the communication terminal 20-2 is terminated, the communication management unit 402 terminates the display of the setting information in the information terminal 30-1. The information request unit 403 makes a request for transmission of the setting information to the information collection device 50.

The information collection device 50 includes an information management unit 501, a collection unit 502, and a storage unit 503. The collection unit 502 collects the setting information from the information terminal 30-2. In addition, the collection unit 502 stores the setting information received from the information terminal 30-2 in the storage unit 503. The information management unit 501 transmits the setting information stored in the storage unit 503 to the information terminal 30-1 in response to a request made by the management server 40.

FIG. 4 shows a diagram illustrating a configuration of a management table that is retained in the management server 40. In the management table, an address of the information terminal 30-1 that is an information request source and an address of the communication terminal 20-1 are recorded in a correlated manner. Further, a kind of the information terminal 30-1 may be recorded in a correlated manner with the address of the information terminal 30-1. The first information and the second information in FIG. 4 indicate a case in which the kind of the information terminal 30-1 is a PC. In addition, in the management table, an address of the communication terminal 20-2 that is operated by the user and an address of the information collection device 50 that stores the setting information of the information terminal 30-2 that is operated by the user are recorded in a correlated manner. Further, the kind of the information collection device 50 may be recorded in a correlated manner with the address of the information collection device 50. The fourth information to the sixth information in FIG. 4 indicates a case in which the kind of the information collection device 50 is the home gateway.

Figure 5:
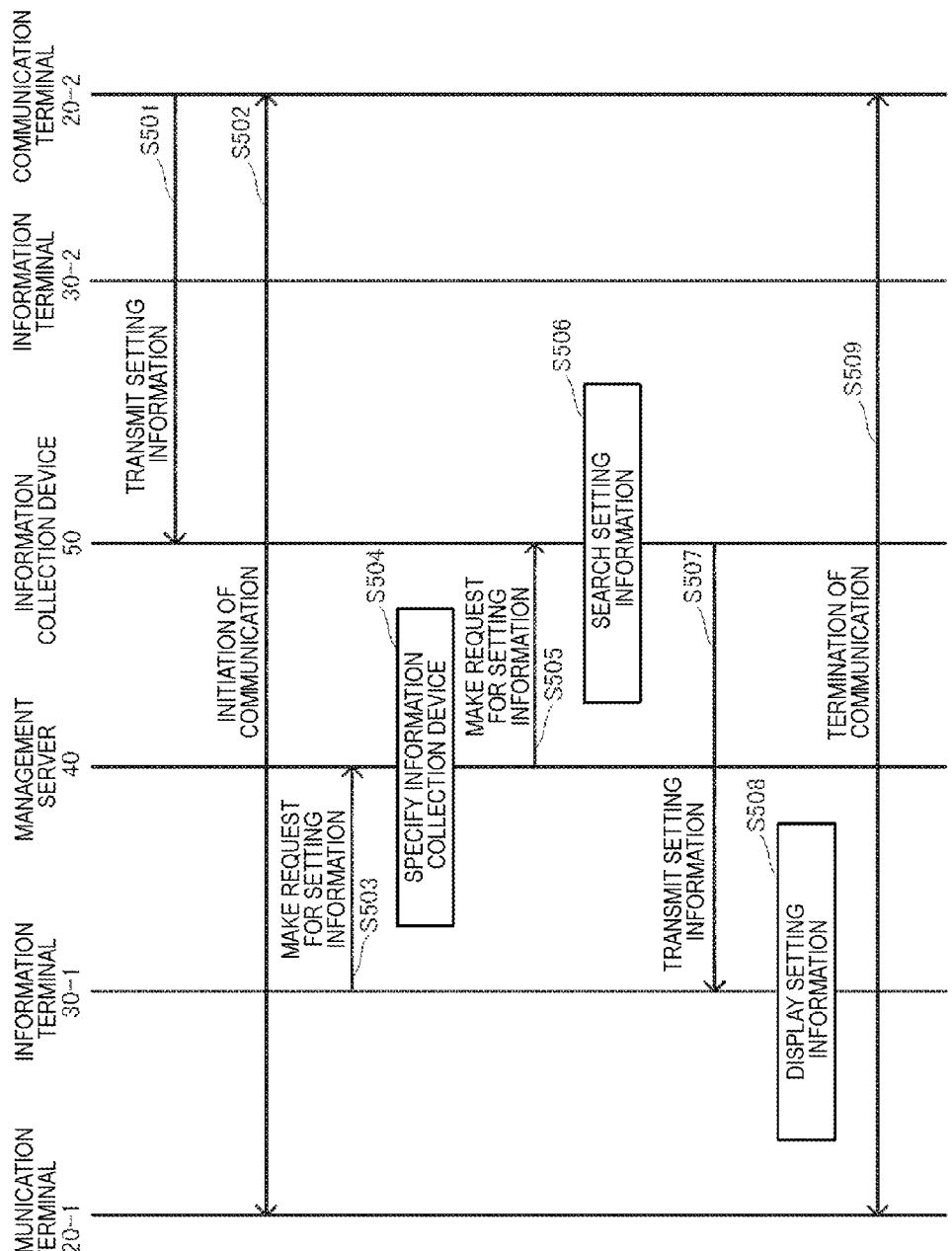
FIG. 5 is a sequence diagram illustrating an operation of the information sharing system according to the second embodiment.

FIG. 5 shows a sequence diagram illustrating an operation of the information sharing system according to the embodiment. First, the collection unit 502 of the information collection device 50 collects the setting information of the information terminal 30-2 that is managed by itself and stores the setting information in the storage unit 503 (Step S501). A timing at which the collection unit 502 collects the setting information may be set at every predetermined time. In addition, in a case where variation in the setting information such as power ON/OFF occurs, the information terminal 30-2 may transmit the setting information to the information collection device 50.

Next, communication is initiated between the communication terminal 20-1 that is operated by the operator and the communication terminal 20-2 that is operated by the user (Step S502).

A request for transmission of the setting information of the information terminal 30-2 that is operated by the user is made with respect to the management server 40 from the information terminal 30-1 that is operated by the operator (Step S503).

The management server 40 specifies an address of the information collection device 50 with reference to the management table (Step S504).

The management server 40 transmits the request for transmission of the setting information with respect to the specified address of the information collection device 50 (Step S505).

When receiving the request for transmission, the information collection device 50 searches and reads out the setting information that is stored in itself (Step S506), and transmits the setting information with respect to the address of the information terminal 30-1 which is instructed from the management server 40 (Step S507).

The information terminal 30-1 displays the setting information that is received (Step S508).

When communication between the user and the operator is terminated, the process is completed (Step S509).

Figure 6:
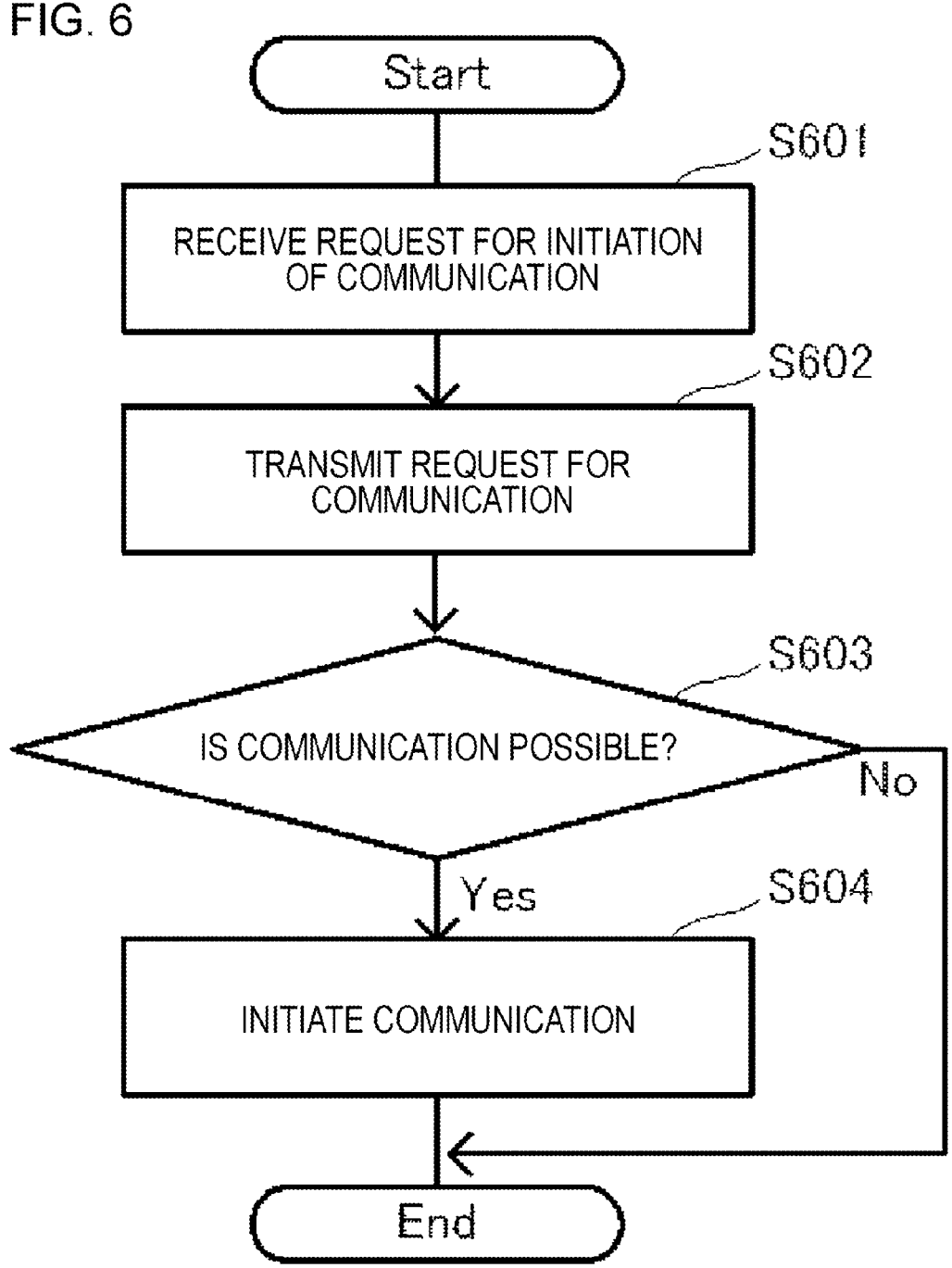
FIG. 6 is a flow chart illustrating details of Step S502 shown in FIG. 5.

FIG. 6 shows a flowchart illustrating details of Step S502 shown in FIG. 5. First, when the user carries out an operation for initiating communication using the communication terminal 20-2, the communication processing unit 201 of the communication terminal 20-2 transmits a request for initiation of communication with the communication terminal 20-1 with respect to the management server 40 (Step S601).

When receiving the communication request from the communication terminal 20-2, the communication management unit 402 of the management server 40 transmits the communication request with respect to the communication terminal 20-1 (Step S602).

When receiving the communication request, the communication processing unit 202 of the communication terminal 20-1 determines whether or not communication with the communication terminal 20-2 is possible (Step S603). In a case where communication is possible (Yes in Step S603), a session is established between the communication processing unit 202 of the communication terminal 20-1 and the communication processing unit 201 of the communication terminal 20-2, and thus communication is initiated (Step S604).

On the other hand, in a case where communication is impossible (No in Step S603), communication is not initiated and the process is terminated. In addition, in FIG. 6, a case in which the user carries out the operation for initiating communication is described as an example, but the operator may carry out the operation for initiating communication.

Figure 7:
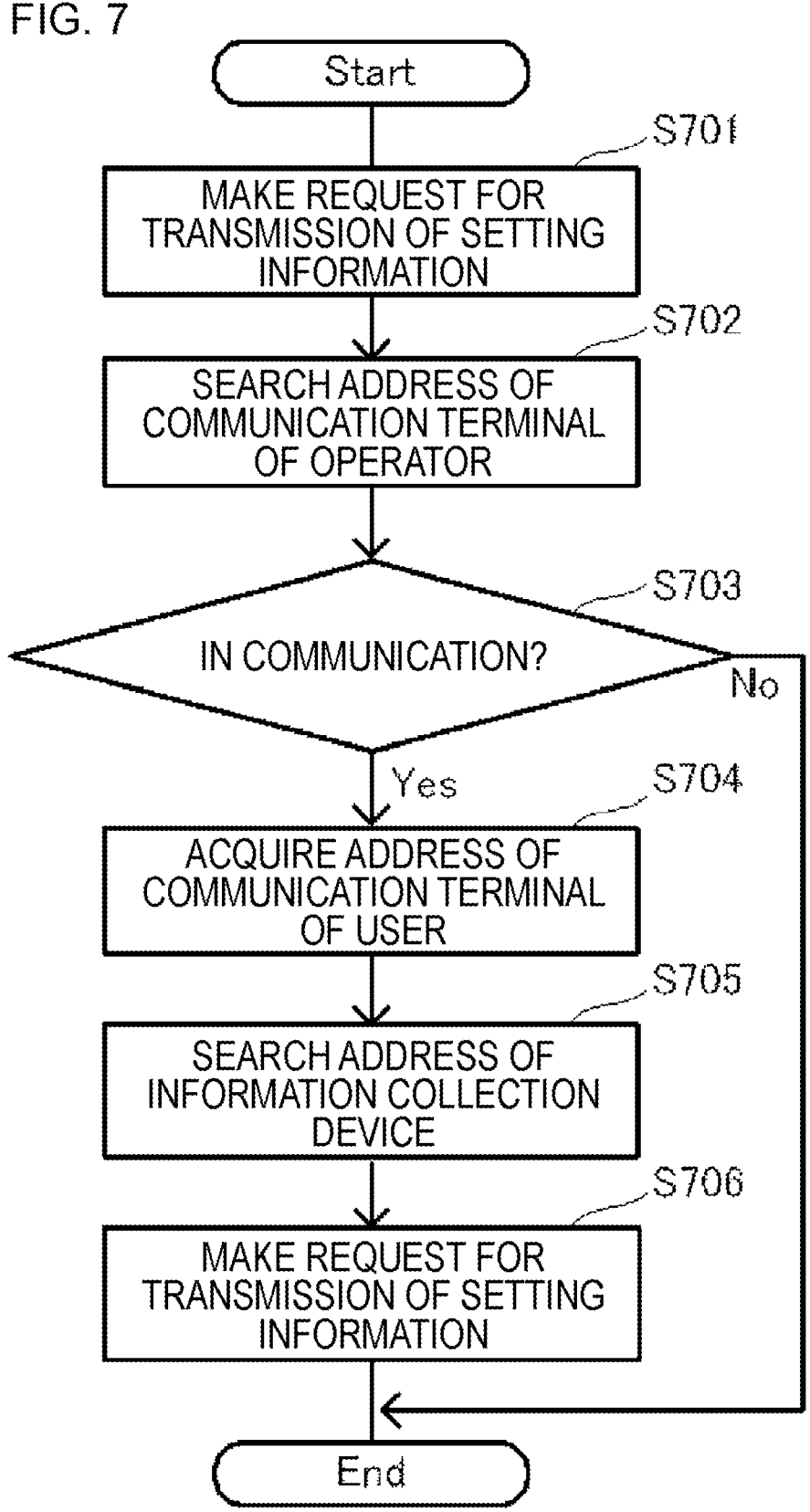
FIG. 7 is a flow chart illustrating details of Step S503 to Step S505 which are shown in FIG. 5.

FIG. 7 shows a flowchart illustrating details of Step S503 to Step S505 shown in FIG. 5. First, when the operator carries out an operation for making a request for transmission of the setting information using the information terminal 30-1, the acquisition unit 302 creates a request for transmission, and transmits the request to the management server 40 (Step S701). The address of the information terminal 30-1 is included in the request for transmission.

When receiving the request for transmission, the communication management unit 402 of the management server 40 searches an address of the communication terminal 201 which is correlated with the address of the information terminal 30-1 that is a request transmission source with reference to the management table (Step S702). For example, in the management table shown in FIG. 4, in a case where the address of the information terminal 30-1 which is included in the request for transmission is "Display01@ΔΔΔ.co.jp", in the recorded information in which a kind is "information terminal" (PC in FIG. 4), the communication management unit 402 specifies that the address of the communication terminal 20-1 corresponding to the information terminal 30-1 that is a request transmission source is "Support01@ΔΔΔ.co.jp".

The communication management unit 402 determines whether or not the communication terminal 20-1 is in communication on the basis of the address of the specified communication terminal 20-1 (Step S703). In a case where communication between the communication terminal 20-1 and another communication terminal is established (Yes in Step S703), the communication management unit 402 confirms a session that is established, and acquires an address of the communication terminal 20-2 that is a communication counterpart (Step S704).

The communication management unit 402 specifies an address of the information collection device 50 that is correlated with the address of the communication terminal 20-2 which is acquired in Step S704 with reference to the management table (Step S705).

For example, in the management table shown in FIG. 4, in a case where the address of the communication terminal 20-2 which is acquired in Step S704 is "User01@□□□.ne.jp", in the recorded information in which a kind is "information collection device" (home gateway in FIG. 4), the communication management unit 402 specifies that the address of the information collection device 50 which is correlated with the address of the communication terminal 20-2 is "HGW01@□□□.ne.jp".

The information request unit 403 transmits a request for transmission of the setting information with respect to the address of the information collection device 50 which is specified by the communication management unit 402 (Step S706). The address of the information terminal 30-1 that is a setting information request source is included in the request for transmission.

On the other hand, in a case where the communication terminal 20-1 is not in communication (No in Step S703), the communication management unit 402 completes the process.

Figure 8:
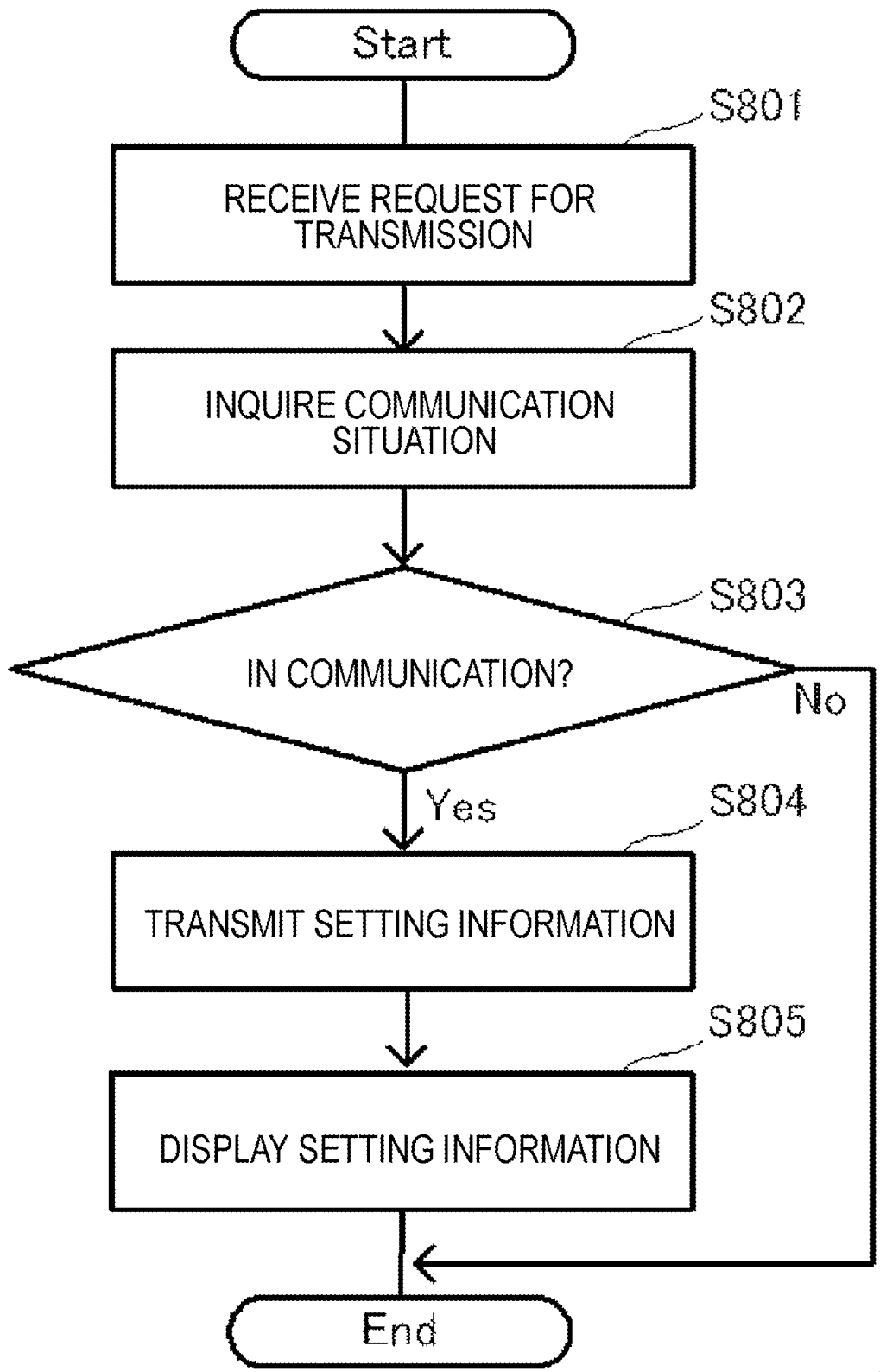
FIG. 8 is a flow chart illustrating details of Step S506 to Step S508 which are shown in FIG. 5.

FIG. 8 shows a flowchart illustrating details of Step S506 to Step S508 shown in FIG. 5. When receiving the request for transmission from the information request unit 403 of the management server 40 (Step S801), the information management unit 501 of the information collection device 50 transmits the address of the information terminal 30-1 which is included in the request for transmission to the management server 40, and makes a request to confirm a communication situation of the communication terminal 20-1 that is correlated with the information terminal 30-1 (Step S802).

The communication management unit 402 of the management server 40 determines whether or not communication between the communication terminal 20-1 and the communication terminal 20-2 is established. Specifically, the communication management unit 402 specifies the communication terminal 20-1 that is correlated with the received address of the information terminal 30-1 with reference to the management table, and specifies the communication terminal 20-2 that is correlated with the information collection device 50 that is an inquiry transmission source. In addition, the communication management unit 402 determines whether or not the communication terminal 20-1 and the communication terminal 20-2 that are specified are in communication, and transmits the determination result to the information collection device 50.

In a case where the received result indicates that the communication terminal 20-1 and the communication terminal 20-2 are in communication (Yes in Step S803), the information management unit 501 of the information collection device 50 reads out the setting information of the information terminal 30-2 which is stored in the storage unit 503, and transmits the setting information to the information terminal 30-1 (Step S804).

The acquisition unit 302 of the information terminal 30-1 displays the setting information that is received on the display unit 301 (Step S805).

On the other hand, in a case where the received result indicates that the communication terminal 20-1 and the communication terminal 20-2 are not in communication (No in Step S803), the information management unit 501 completes the process.

Figure 9:
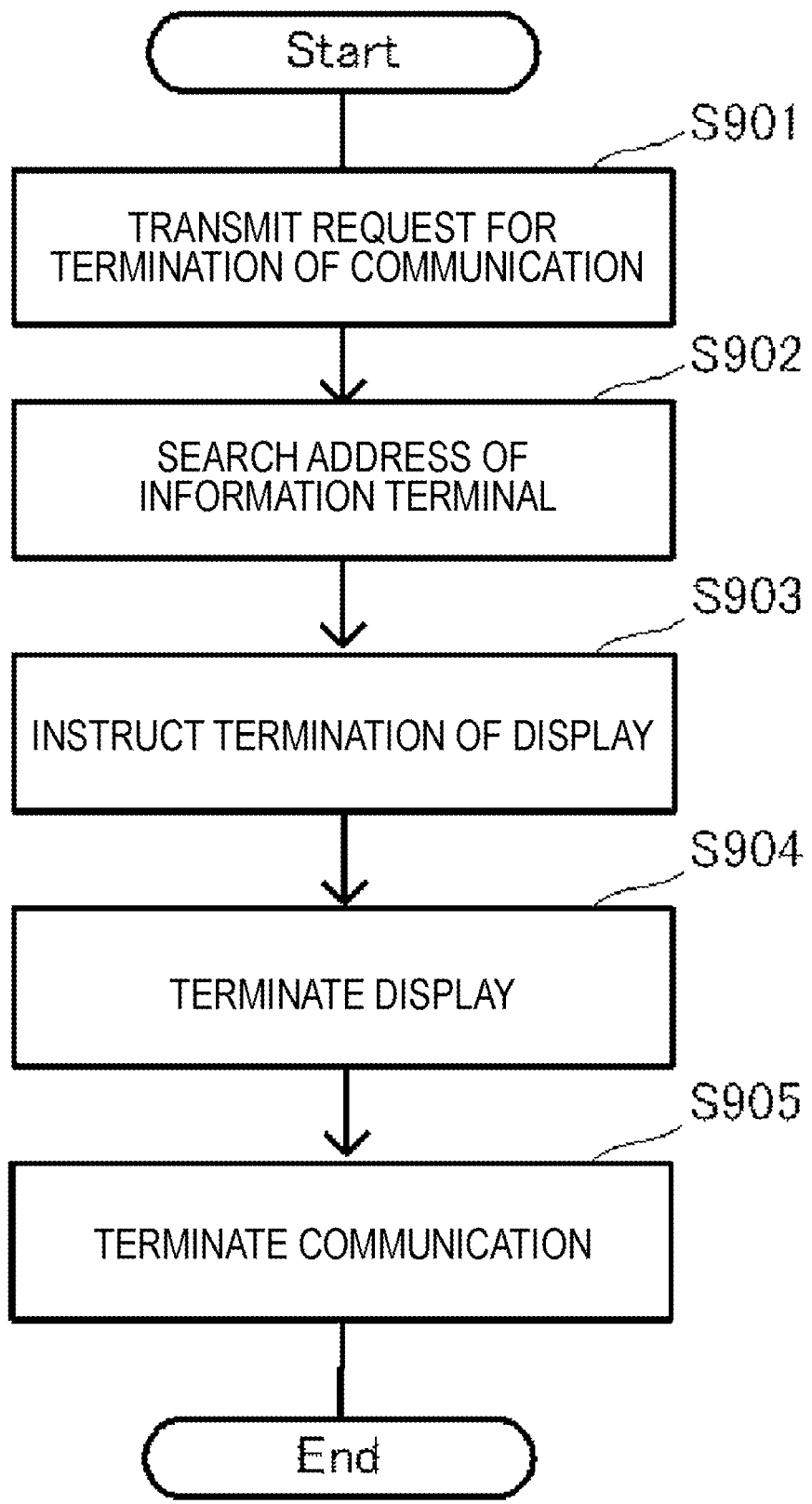
FIG. 9 is a flow chart illustrating details of Step S509 shown in FIG. 5.

FIG. 9 shows a flowchart illustrating details of Step S509 shown in FIG. 5. When the user carries out the operation for terminating communication using the communication terminal 20-2, the communication processing unit 201 of the communication terminal 20-2 transmits a request for termination of communication with the communication terminal 20-1 with respect to the management server 40 (Step S901).

When receiving the request for termination of communication from the communication terminal 20-2, the communication management unit 402 of the management server 40 confirms the session that is established, and acquires the address of the communication terminal 20-1 that is a communication counterpart of the communication terminal 20-2. In addition, the communication management unit 402 searches the address of the information terminal 30-1 which is correlated with the address of the communication terminal 20-1 with reference to the management table (Step S902).

Next, the communication management unit 402 instructs the information terminal 30-1 to terminate the display of the setting information (Step S903). The acquisition unit 302 of the information terminal 30-1 terminates the display on the display unit 301 in response to the instruction by the management server 40 (Step S904).

In addition, the communication management unit 402 of the management server 40 terminates communication between the communication terminal 20-1 and the communication terminal 20-2 (Step S805). In addition, in FIG. 9, a case in which the user carries out the operation for terminating communication is described as an example, but the operator may carry out the operation for terminating communication.

As described above, the information sharing system according to the embodiment may stably share information. It is not necessary for the information terminal that is operated by the operator to directly transmit and receive information such as an address to and from the information terminal that is operated by the user, and thus the setting information relating to the information terminal that is operated by the user may be acquired while preventing illegality such as impersonation by interception.

In addition, according to the embodiment, the management server and the information collection device determine that transmission of the setting information is possible only in a case where the communication terminals are in communication. According to this, even when the address of the information terminal that is an information request source is intercepted, illegal acquisition of the setting information is impossible as long as communication between the communication terminals is not established. Accordingly, risk of affection by impersonation and the like may be reduced. For example, in a case where the communication terminals that are operated by the user and operator are telephones that make a call using the SIP protocol, the request for setting information is permitted only in a case where the communication terminals of the operator and user are in communication. In this case, the SIP addresses of the respective terminals are recorded in the management table.

In addition, according to the embodiment, when communication between the communication terminals is terminated, the display of the setting information in the information terminal can be terminated. According to this, unnecessary leakage of the setting information may be prevented.

In addition, in the embodiment, a case in which the information terminal that is operated by the user is one device is described as an example, but a plurality of the information terminals are possible. In this case, the information collection device retains plural pieces of setting information of the plurality of information terminals and transmits the setting information to an information terminal that is operated by the operator in response to a request made by the management server. The information collection device may transmit all pieces of the setting information to the information terminal of the operator, or may transmit only specific setting information such as requested by the operator. In a case of transmitting the specific setting information among the plural pieces of setting information, identification information that identifies a specific information terminal may be included in the request of the setting information which is transmitted to the information collection device from the information terminal that is operated by the operator through the management server.

In addition, in the embodiment, a connection situation between communication terminals is confirmed two times including a case in which the management server transmits a request for transmission of the setting information to the information collection device and a case in which the information collection device receives the request for transmission of the setting information from the management server, but the communication situation may be confirmed in any one stage.

In addition, in the embodiment, a case in which an address of the information terminal that is a transmission destination of the setting information is transmitted to the management server when the information collection device makes a request for confirmation of the communication situation between communication terminals to the management server is described as an example. Here, the address of the communication terminal that is used by the operator or user may be used instead of the address of the information terminal. In this case, the address of the communication terminal is included in the request for transmission which is transmitted to the information collection device.

Third Embodiment

A third embodiment is different from the second embodiment in that the communication terminal and the information terminal which are operated by the user and the operator are configured as an integrated communication device. Hereinafter, description will be made mainly on a difference from the second embodiment with reference to FIGS. 2 and 3 which illustrate a configuration of an information sharing system according to the third embodiment.

In FIG. 2, the second embodiment in that the communication device 10-1 is a device in which the communication terminal 20-1 and the information terminal 30-1 are integrated, and the communication device 10-2 is a device in which the communication terminal 20-2 and the information terminal 30-2 are integrated. Accordingly, this configuration is different from that of the second embodiment.

As shown in FIG. 4, in the information sharing system according to the second embodiment, the communication terminal and the information terminal have addresses on networks which are different from each other. On the contrary, in the embodiment, each of the communication devices 10-1 and 10-2 has one address on a network.

FIG. 10 shows a diagram illustrating an example of a management table according to the embodiment. An address of the communication device 10-2 that is operated by the user and an address of the information collection device 50 that retains the setting information of the communication device 10-2 are recorded in a management table in a correlated manner.

The outline of an operation of the information sharing system according to the embodiment is the same as the operation of the sequence diagram shown in FIG. 5 except that the subject of the operation of the communication terminal 20-1 and the information terminal 30-1 is changed to the communication device 10-1, and the subject of the operation of the communication terminal 20-2 and the information terminal 30-2 is changed to the communication device 10-2, and description thereof will not be repeated.

Figure 11:
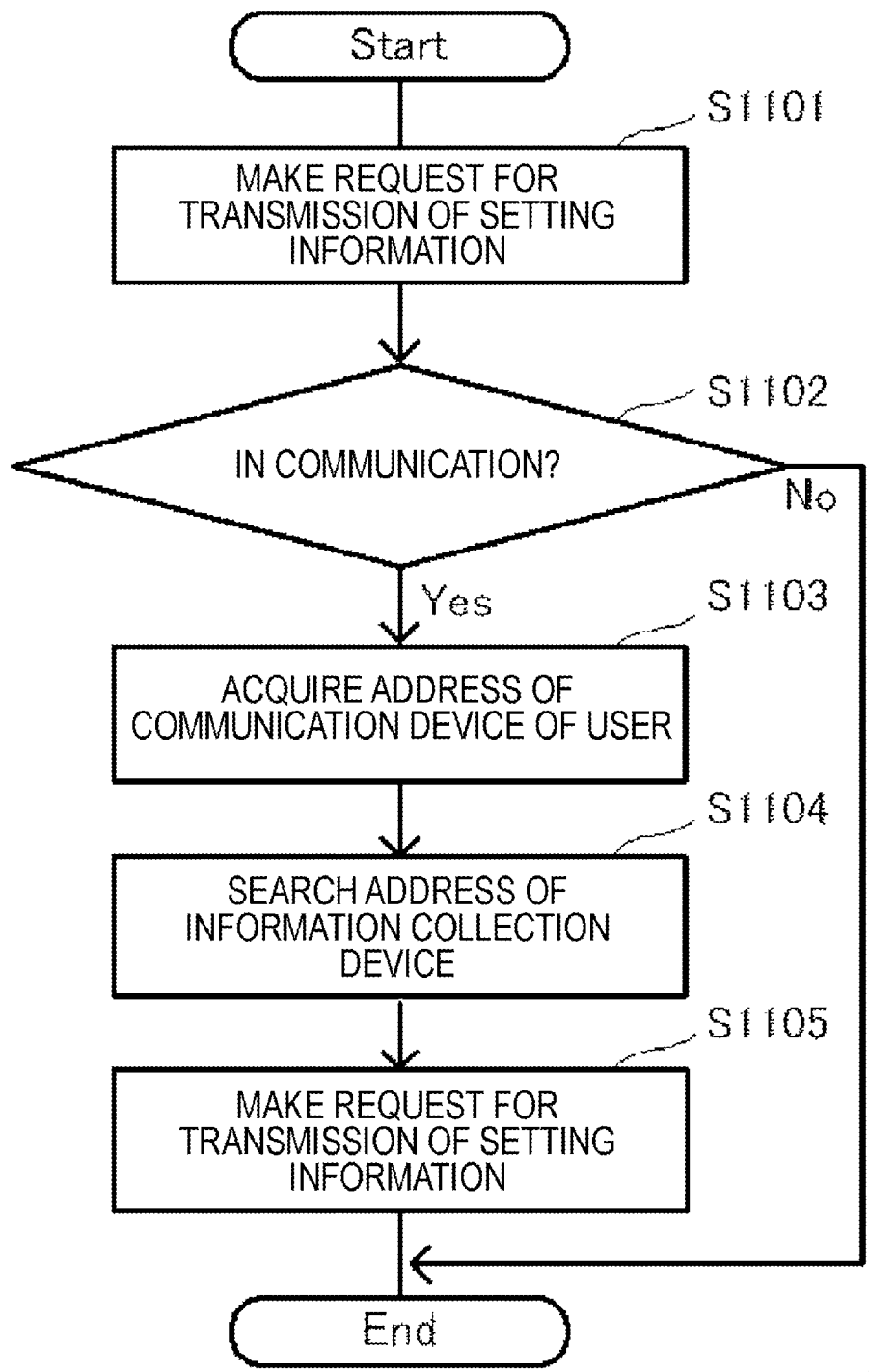
FIG. 11 is a flow chart illustrating an operation of an information sharing system according to the third embodiment.

FIG. 11 shows a flowchart illustrating the operation of the information sharing system according to the embodiment. When the operator carries out an operation of making a request for setting information using the communication device 10-1, the acquisition unit 302 of the information terminal 30-1 creates a request for transmission in response to an input of the operator, and transmits the request to the management server 40 (Step S1101). The address of the communication device 10-1 is included in the request for transmission.

When receiving the request for transmission, the communication management unit 402 of the management server 40 determines whether or not the communication device 10-1 is in communication on the basis of the address of the communication device 10-1 (Step S1102). In a case where the communication device 10-1 is in communication (Yes in Step S1102), the communication management unit 402 confirms a session that is established, and acquires an address of the communication device 10-2 that is a communication counterpart (Step S1103).

The communication management unit 402 searches an address of the information collection device 50, which is correlated with the address of the communication device 10-2 which is acquired in S1103, with reference to the management table (Step S1104).

For example, in the management table shown in FIG. 10, in a case where the address of the communication device 10-2 which is acquired in S1103 is "User01@□□□.ne.jp", the communication management unit 402 specifies that the address of the information collection device 50, which is correlated with the address of the communication device 10-2, is "HGW01@□□□.ne.jp".

The information request unit 403 transmits a request for transmission with respect to the address of the information collection device 50 which is specified by the communication management unit 402 (Step S1105). The address of the communication device 10-1 that is a transmission destination of the setting information is included in the request for transmission.

On the other hand, in a case where the communication device 10-1 is not in communication (No in Step S1102), the communication management unit 402 terminates the process.

Next, with regard to details of Step S509 shown in FIG. 5, the operation of the information sharing system according to the embodiment will be described with reference to FIG. 9. When the user carries out an operation of terminating communication using the communication device 10-2, the communication processing unit 201 of the communication device 10-2 transmits a request for termination of communication with the communication device 10-1 with respect to the management server 40 (Step S901).

When receiving the request for termination of communication from the communication device 10-2, the communication management unit 402 of the management server 40 confirms a session that is established, and acquires the address of the communication device 10-1 that is a communication counterpart of the communication device 10-2 (Step S902).

In addition, the management server 40 instructs the communication device 10-1 to terminate display of the setting information (Step S903).

The acquisition unit 302 of the communication device 10-1 terminates the display on the display unit 301 in response to the instruction of the management server 40 (Step S904).

In addition, the communication management unit 402 of the management server 40 terminates communication between the communication device 10-1 and the communication device 10-2 (Step S905). In addition, in FIG. 9, a case in which the user carries out the operation for terminating communication is described as an example, but the operator may carry out the operation for terminating communication.

As described above, according to the embodiment, even in a configuration of the communication device in which the communication terminal and the information terminal are integrated, information may be shared without directly connecting information terminals that share information.

Figure 12:
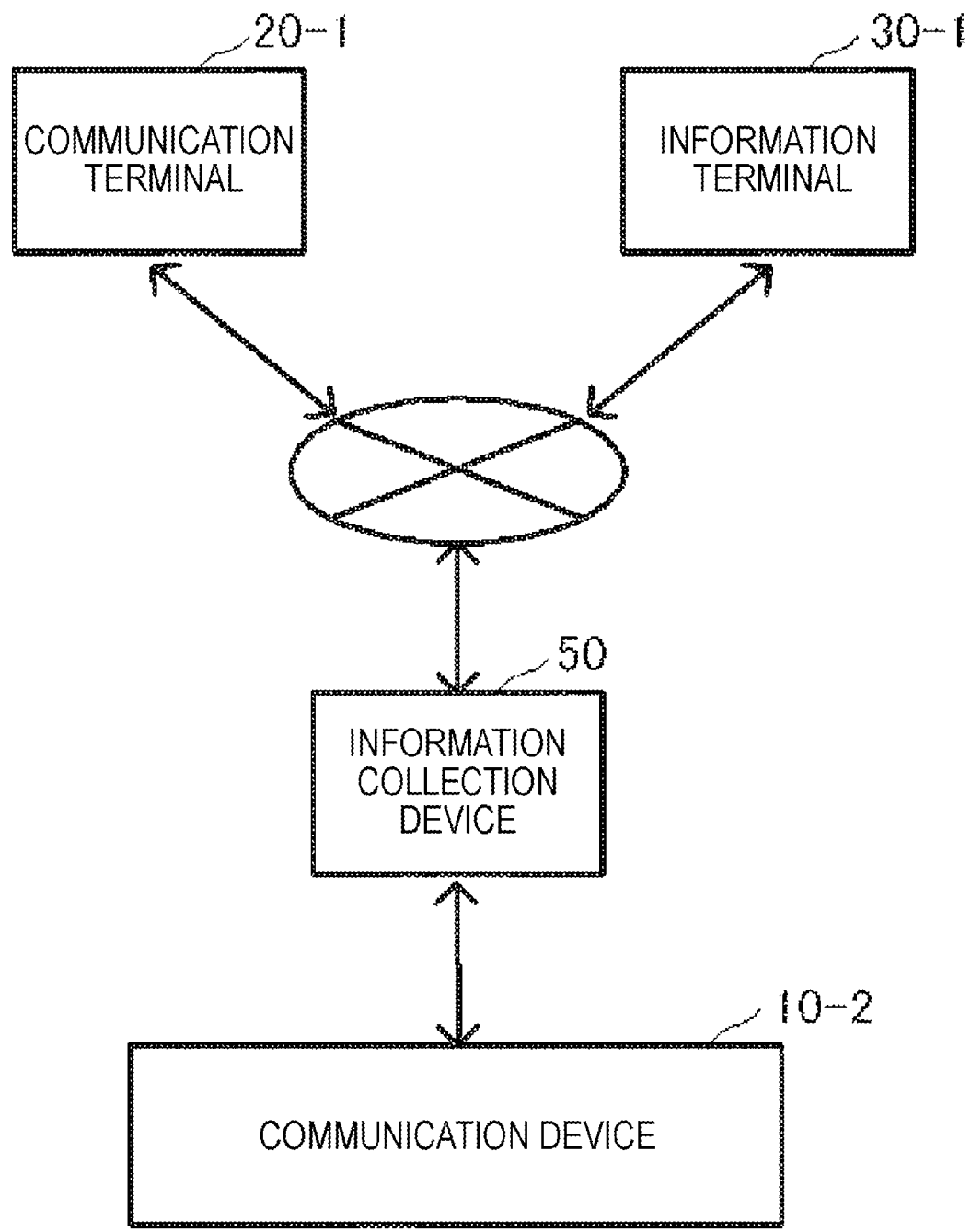
FIG. 12 is a diagram illustrating a configuration example of the information sharing system according to the third embodiment.
Figure 13:
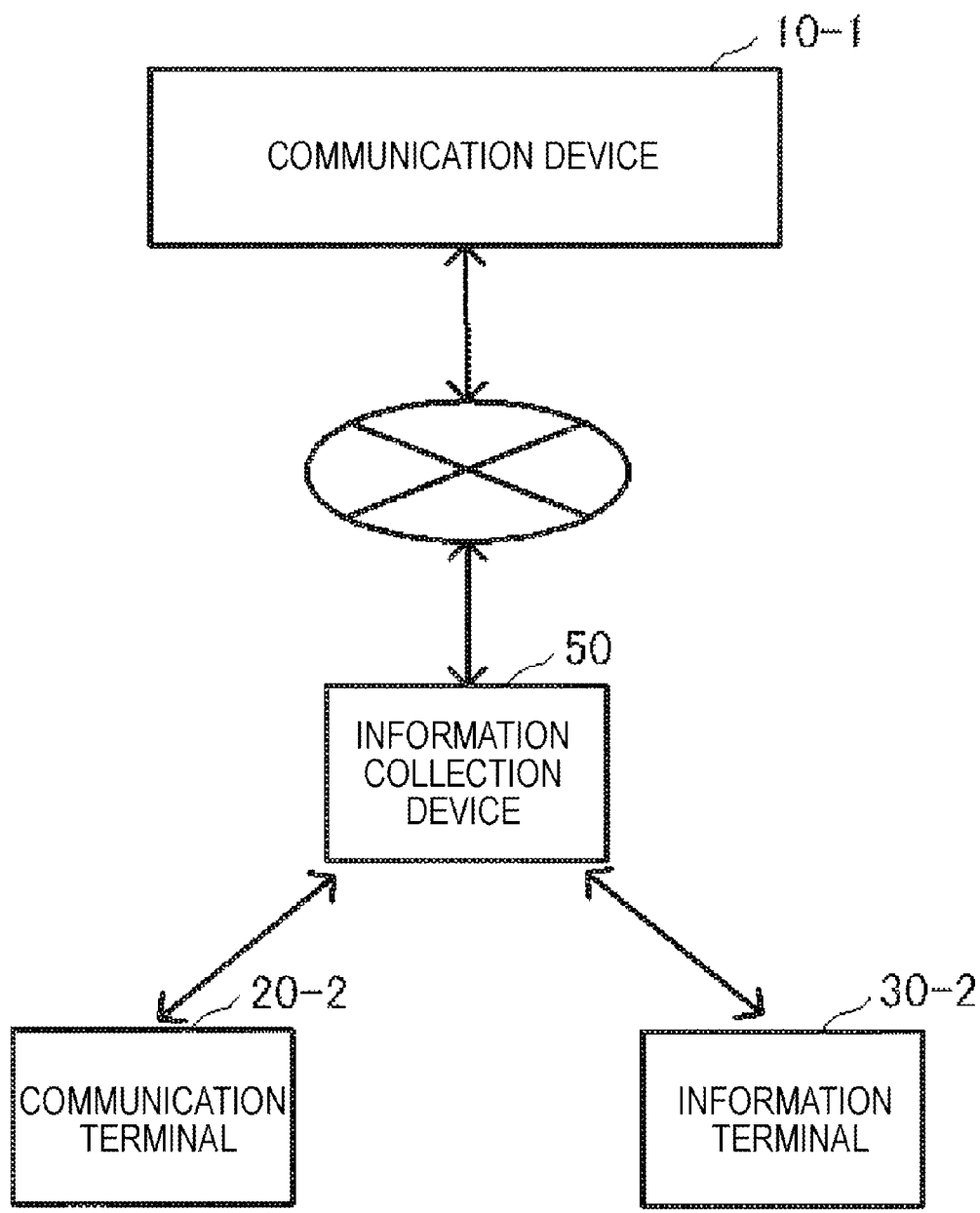
FIG. 13 is a diagram illustrating the configuration example of the information sharing system according to the third embodiment.

In addition, in the embodiment, description is made with respect to a case in which both of the communication devices that are operated by the operator and the user have a configuration in which the communication terminal and the information terminal are integrated as an example, but the configuration of the communication terminal and the information terminal is not limited thereto. For example, as shown in FIG. 12, the communication terminal and the information terminal that are operated by the user may be configured to be integrated with each other, the communication terminal and the information terminal that are operated by the operator may be configured to be independent from each other, and these may be configured to be inverted from each other as shown in FIG. 13.

Figure 14:
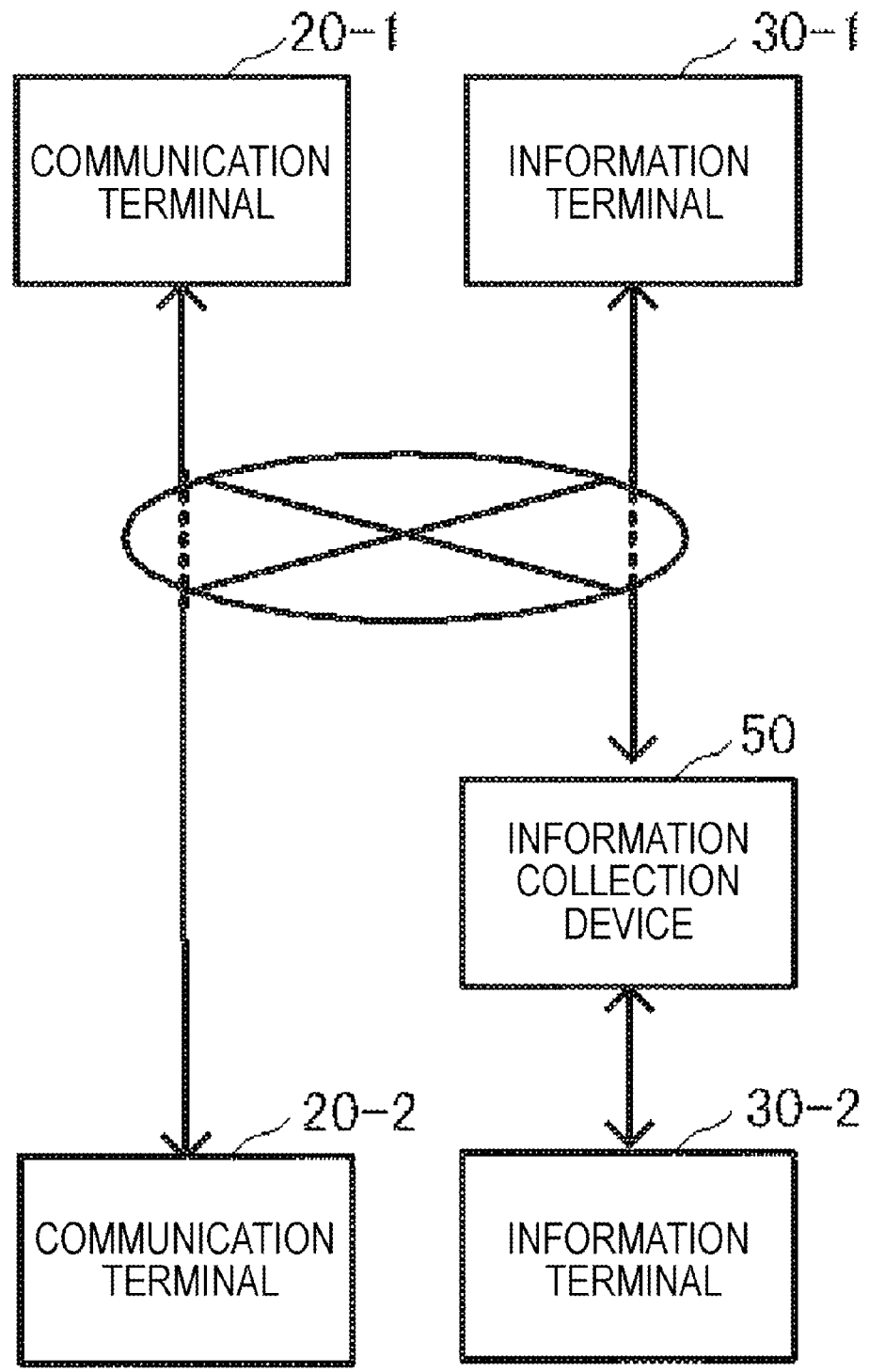
FIG. 14 is a diagram illustrating the configuration example of the information sharing system according to the third embodiment.
Figure 15:
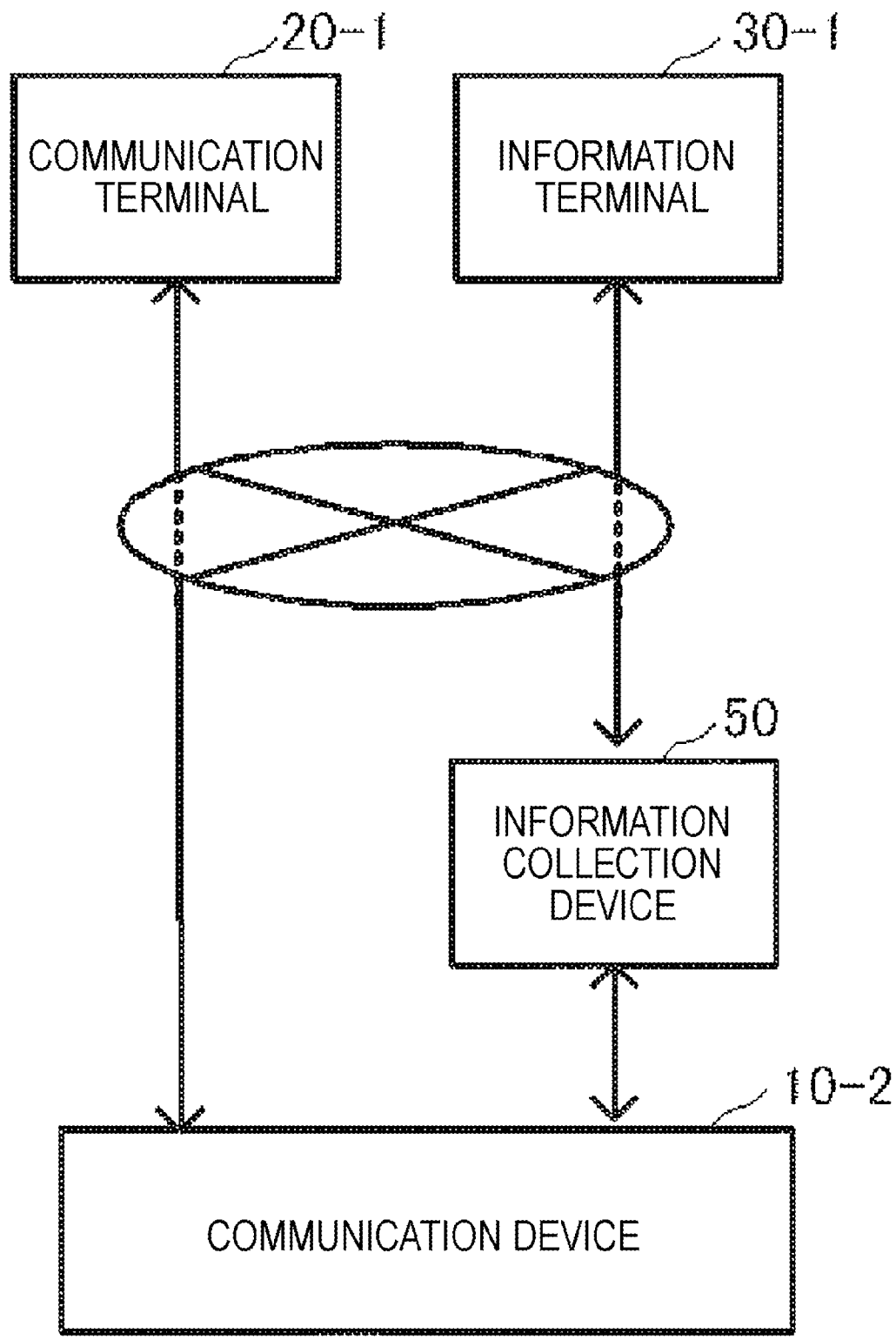
FIG. 15 is a diagram illustrating the configuration example of the information sharing system according to the third embodiment.
Figure 16:
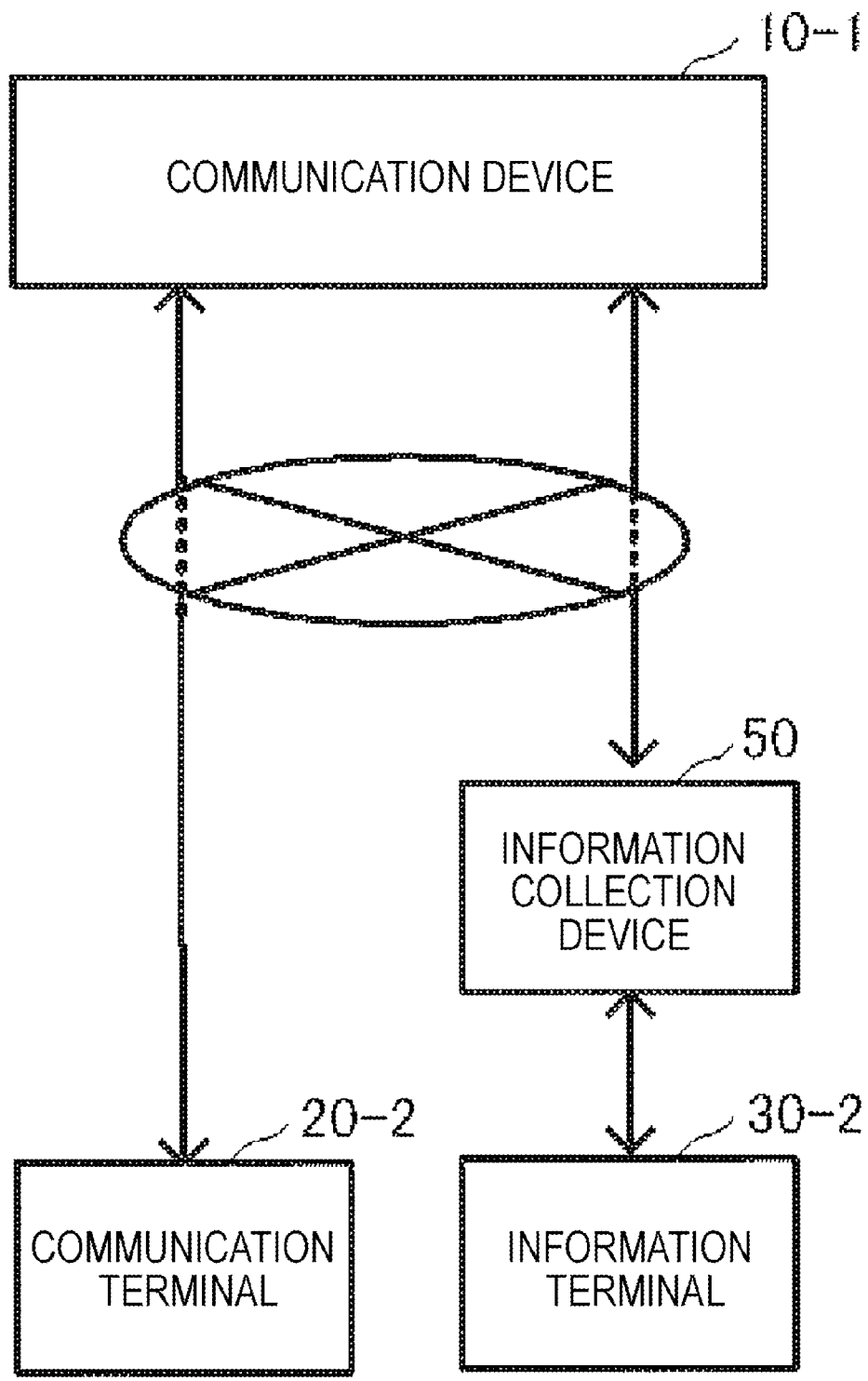
FIG. 16 is a diagram illustrating the configuration example of the information sharing system according to the third embodiment.
Figure 17:
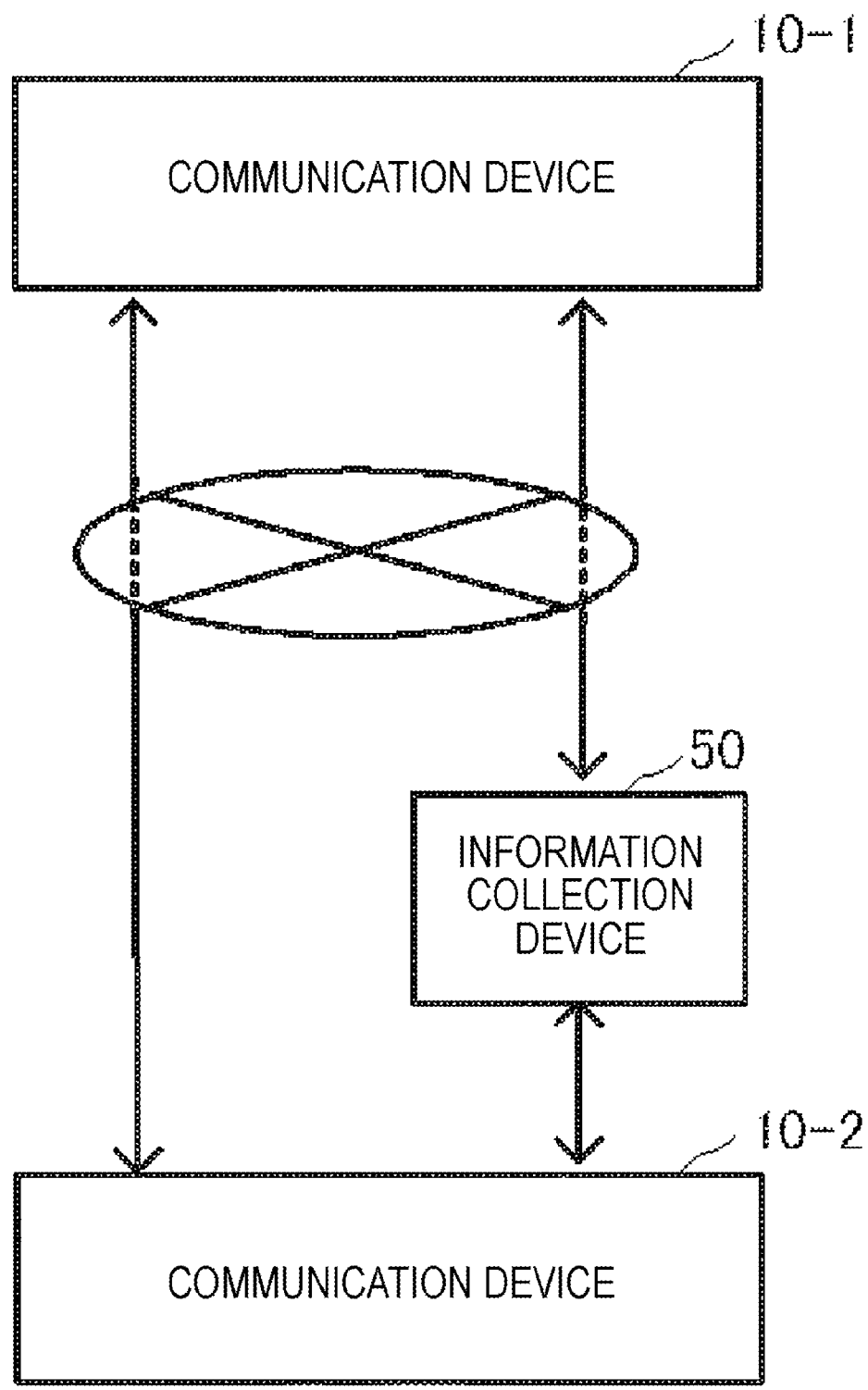
FIG. 17 is a diagram illustrating the configuration example of the information sharing system according to the third embodiment.

In addition, as shown in FIG. 14, the communication terminal 20-1 and the communication terminal 20-2 may be provided to be opposite to each other, and the information terminal 30-1 and the information collection device 50 may be provided to be opposite to each other. Further, in a configuration in which the communication terminal 20-1 and communication terminal 20-2 are provided to be opposite to each other, and the information terminal 30-1 and the information collection device 50 are provided to be opposite to each other, a communication terminal and an information terminal of one side may be integrated to configure one communication device (FIGS. 15 and 16), or in each of both sides, a communication terminal and an information terminal may be integrated to configure one communication device (FIG. 17). In addition, in FIGS. 12 to 17, the management server 40 is not shown.

Fourth Embodiment

In a fourth embodiment, transmission of the request for the setting information from the management server is triggered by establishment of communication between communication terminals, and thus the fourth embodiment is different from the second embodiment in which the operation of the communication terminal by the operator becomes a trigger.

A configuration of the information sharing system according to the embodiment is the same as that of the second embodiment. Accordingly, FIGS. 2 and 3 are referenced and description thereof will not be repeated.

Figure 18:
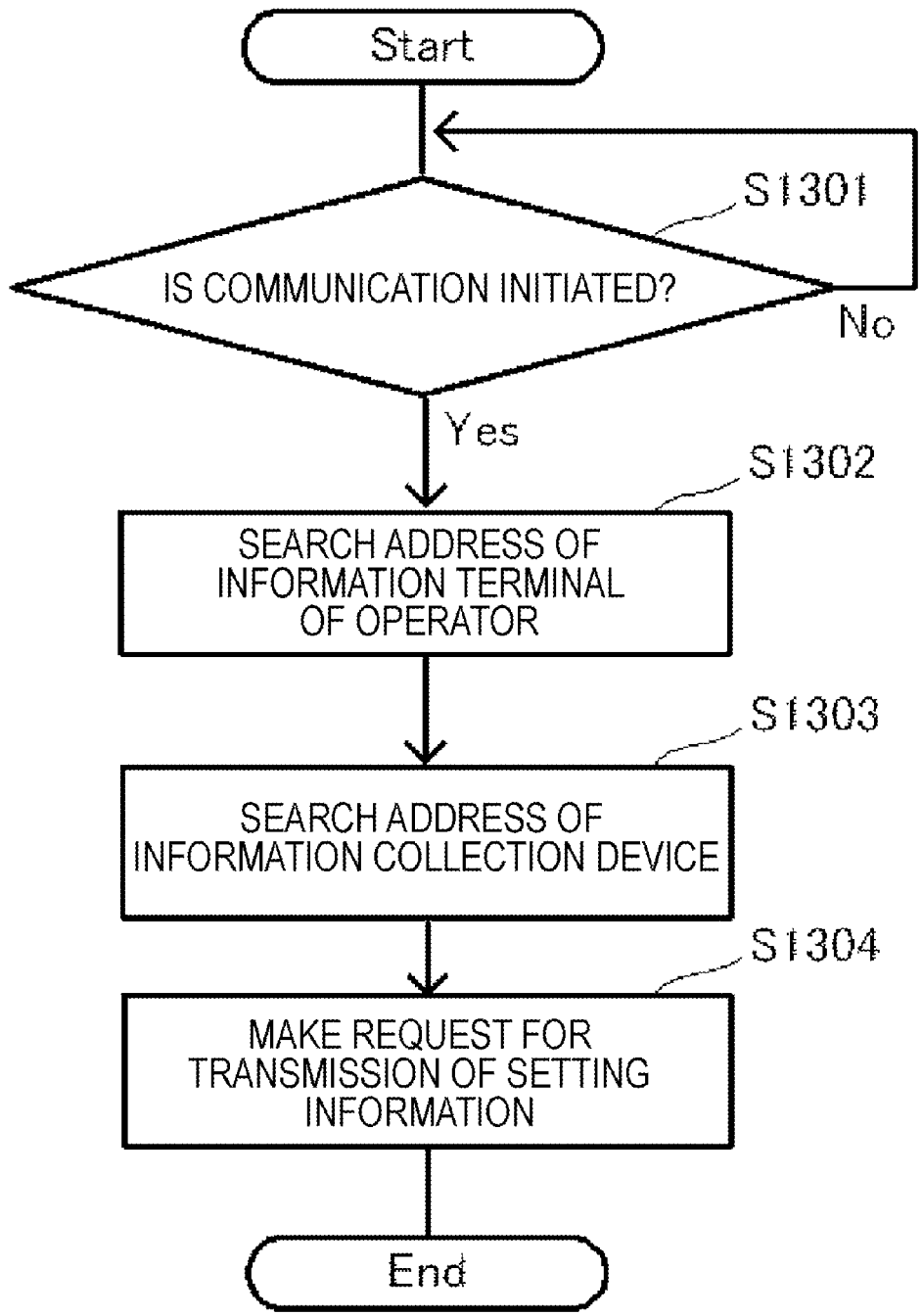
FIG. 18 is a flow chart illustrating an operation of a management server according to a fourth embodiment.

FIG. 18 shows a flowchart illustrating an operation of the management server 40 according to the embodiment. When a session between the communication terminal 20-1 and the communication terminal 20-2 is established and communication is initiated (Yes in Step S1301), the communication management unit 402 of the management server 40 searches an address of the information terminal 30-1 that is operated by the operator on the basis of an address of the communication terminal 20-1 that is operated by the operator with reference to the management table (Step S1302)

In addition, the communication management unit 402 searches an address of the information collection device 50 on the basis of an address of the communication terminal 20-2 that is operated by the user with reference to the management table (Step S1303).

The information request unit 403 transmits a request for transmission with respect to an address of the information collection device 50 which is specified by the communication management unit 402 in Step S1303 (Step S1304). An address of the information terminal 30-1 that is a transmission destination of the setting information is included in the request for transmission. The operation of the information collection device 50 that receives the request for transmission continues to Step S506 shown in FIG. 5.

As described above, according to the embodiment, when communication between the communication terminals is initiated, the request for transmission of the setting information of the information terminals that is operated by the user is created. Accordingly, the setting information can be displayed on the information terminal that is operated by the operator without waiting the operation by the operator.

As described above, according to the first to fourth embodiments, the following invention is disclosed.

Additional Statement 1

An information sharing system which allows setting information relating to a second communication device to be shared with a first communication device, the information sharing system including:
an information collection device that retains the setting information and is communicatively connected to the first communication device; and
a management device that makes a request for transmission of the setting information with respect to the information collection device,
wherein the management device includes,
a communication management unit that determines whether or not communication is established between the first and second communication devices when receiving the request for transmission of the setting information, and
an information request unit that makes a request for transmission of the setting information with respect to the information collection device in a case where it is determined by the communication management unit that the communication is established between the first and second communication devices, and
the information collection device includes,
an information management unit that transmits the setting information to the first communication device in response to the request made by the information request unit.

Additional Statement 2

The information sharing system according to Additional Statement 1,
wherein when communication is established and initiated between the first and second communication devices, the information request unit makes a request for transmission of the setting information with respect to the information collection device.

Additional Statement 3

The information sharing system according to Additional Statement 1,
wherein when receiving the request for transmission of the setting information from the information request unit, the information management unit inquires a communication situation between the first and second communication devices of the communication management unit,
the communication management unit determines whether or not communication between the first and second communication devices is established in response to the inquiry from the information management unit, and
when receiving a determination result indicating that communication between the first and second communication devices is established from the communication management unit, the information management unit transmits the setting information.

Additional Statement 4

The information sharing system according to Additional Statement 1,
wherein the first communication device includes,
a first communication terminal, and
a first information terminal that has an address on a network which is different from that of the first communication terminal,
the second communication device includes,
a second communication terminal that is communicatively connected to the first communication terminal, and
a second information terminal that has an address on a network which is different from that of the second communication terminal,
in a case where communication between the first and second communication terminals is established, the information request unit makes a request for transmission of setting information relating to the second information terminal with respect to the information collection device, and
the information management unit retains the setting information of the second information terminal and transmits the setting information to the first information terminal in response to the request made by the information request unit.

Additional Statement 5

The information sharing system according to Additional Statement 4,
wherein the management device further includes,
a storage unit that stores a management table in which the first information terminal and the first communication terminal are correlated with each other, and the information collection device and the second communication terminal are correlated with each other, and
the information request unit specifies the information collection device with reference to the management table stored in the storage unit, and makes a request for transmission of the setting information.

Additional Statement 6

The information sharing system according to Additional Statement 4,
wherein when communication between the first and second communication terminals is established and initiated, the information request unit makes a request for transmission of the setting information with respect to the information collection device.

Additional Statement 7

The information sharing system according to Additional Statement 4,
wherein when receiving a request for transmission from the information request unit, the information management unit inquires a communication situation between the first and second communication terminals of the communication management unit,
the communication management unit determines whether or not communication between the first and second communication devices is established in response to the inquiry from the information management unit, and
when receiving a determination result indicating that communication between the first and second communication terminals is established from the communication management unit, the information management unit transmits the setting information.

Additional Statement 8

An information sharing management device which allows setting information relating to a second communication device to be shared with a first communication device, the information sharing management device including:

a communication management unit that determines whether or not communication is established between the first and second communication devices when receiving the request for transmission of the setting information; and an information request unit that makes a request for transmission of the setting information with respect to an information collection device that retains the setting information and is communicatively connected to the first communication device in a case where it is determined by the communication management unit that communication between the first and second communication devices is established.

Additional Statement 9

An information sharing method which allows setting information relating to a second communication device to be shared with a first communication device, the method including:

a step of allowing a management device to determine whether or not communication is established between the first and second communication devices when receiving the request for transmission of the setting information;

a step of allowing the management device to make a request for transmission of the setting information with respect to an information collection device that retains the setting information and is communicatively connected to the first communication device in a case where it is determined in the determination step that communication is established between the first and second communication devices; and a step of allowing the information collection device to transmit the setting information to the first communication device in response to the request in the request step.

Additional Statement 10

An information sharing program causing:

a management device to execute a step of determining whether or not communication is established between a first communication device and a second communication device when receiving a request for transmission of setting information relating to the second communication device;

the management device to execute a step of making a request for transmission of the setting information with respect to an information collection device that retains the setting information and is communicatively connected to the first communication device in a case where it is determined in the determination step that communication is established between the first and second communication devices, and an information collection device to execute a step of transmitting the setting information to the first communication device in response to the request in the request step.

INDUSTRIAL APPLICABILITY

The invention is applicable to a use such as an operator operation of a customer support. In addition, the invention is applicable to a use such as remote maintenance in maintenance of a device such as a computer, or remote management of a building management system such as a security system and a BEMS. Furthermore, the invention is applicable to a use such as an e-learning such as a remote testing.

The present patent application claims priority from Japanese Patent Application No. 2011-202500 filed on Sep. 16, 2011, the disclosure of which is incorporated herein by reference.

The invention claimed is:

1. An information sharing system which allows setting information relating to a second communication device to be shared with a first communication device, the information sharing system comprising:

an information collection device that retains the setting information and is communicatively connected to the first communication device; and a management device that transmits an instruction with respect to the information collection device, the instruction making the information collection device transmit the setting information to the first communication device, wherein the management device includes:

a communication management unit that receives a request from the first communication device, the request indicating to transmit the setting information to the first communication device, and determines whether or not communication is established between the first and second communication devices in response to receiving the request, and an information request unit that transmits the instruction with respect to the information collection device in a case where it is determined by the communication management unit that the communication is established between the first and second communication devices; and the information collection device includes:

an information management unit that transmits the setting information to the first communication device in response to the instruction transmitted by the information request unit.

2. The information sharing system according to claim 1, wherein when receiving the instruction transmitted by the information request unit, the information management unit inquires into a communication situation between the first and second communication devices, the communication management unit determines whether or not communication between the first and second communication devices is established in response to the inquiry from the information management unit, and when receiving a determination result indicating that communication between the first and second communication devices is established from the communication management unit, the information management unit transmits the setting information.

3. The information sharing system according to claim 1, wherein the first communication device includes, a first communication terminal, and a first information terminal that has an address on a network which is different from that of the first communication terminal, the second communication device includes, a second communication terminal that is communicatively connected to the first communication terminal, and a second information terminal that has an address on a network which is different from that of the second communication terminal, in a case where communication between the first and second communication terminals is established, the information request unit transmits the instruction relating to the second information terminal with respect to the information collection device, and the information management unit retains the setting information of the second information terminal and transmits the setting information to the first information terminal in response to the instruction transmitted by the information request unit.

4. The information sharing system according to claim 3, wherein the management device further includes,
   a storage unit that stores a management table in which the first information terminal and the first communication terminal are correlated with each other, and the information collection device and the second communication terminal are correlated with each other, and
   the information request unit specifies the information collection device with reference to the management table stored in the storage unit, and transmits the instruction making the information collection device transmit the setting information to the first communication device.

5. The information sharing system according to claim 3, wherein
   when receiving a transmitted instruction from the information request unit, the information management unit inquires into a communication situation between the first and second communication terminals of the communication management unit,
   the communication management unit determines whether or not communication between the first and second communication terminals is established in response to the inquiry from the information management unit, and
   when receiving a determination result indicating that communication between the first and second communication devices is established from the communication management unit, the information management unit transmits the setting information.

6. An information sharing management device which allows setting information relating to a second communication device to be shared with a first communication device, the information sharing management device comprising:
   a communication management unit that determines whether or not communication is established between the first and second communication devices when receiving a request indicating to transmit the setting information to the first communication device;
   an information request unit that transmits an instruction with respect to an information collection device that retains the setting information and is communicatively connected to the first communication device in a case where it is determined by the communication management unit that communication between the first and second communication devices is established; and
   wherein the information sharing management device is communicatively connected with the first communication device through a network.

7. An information sharing method which allows setting information relating to a second communication device to be shared with a first communication device, the method comprising:
   allowing a management device to determine whether or not communication is established between the first and second communication devices when receiving the request for transmission of the setting information, wherein the management device is communicatively connected with the first communication device through a network;
   allowing the management device to transmit an instruction with respect to an information collection device that retains the setting information and is communicatively connected to the first communication device in a case where it is determined by the management device that communication is established between the first and second communication devices; and
   allowing the information collection device to transmit the setting information to the first communication device in response to the instruction transmitted by the management device.

* * * * *